(12) United States Patent
Yee et al.

(10) Patent No.: US 12,236,301 B2
(45) Date of Patent: Feb. 25, 2025

(54) SYSTEMS AND METHODS TO GENERATE POWER FOR A CONTACTLESS CARD VIA A PIEZOELECTRIC COMPONENT

(71) Applicant: Capital One Services, LLC, McLean, VA (US)

(72) Inventors: Bryant Yee, Washington, DC (US); Kevin Osborn, Newton Highlands, MA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/980,799

(22) Filed: Nov. 4, 2022

(65) Prior Publication Data
US 2024/0152718 A1    May 9, 2024

(51) Int. Cl.
*G06K 19/07* (2006.01)

(52) U.S. Cl.
CPC .................. *G06K 19/0709* (2013.01)

(58) Field of Classification Search
CPC .. G06K 19/0709; G06K 19/06; G06K 19/067; G06K 19/0675; G06K 19/0719; G06K 19/041; H01N 30/00; H03H 9/00; H03H 9/1028; H03H 9/02023
See application file for complete search history.

(56) References Cited

U.S. PATENT DOCUMENTS

| | | | | |
|---|---|---|---|---|
| 5,038,625 A * | 8/1991 | Chen | ................... | G11B 19/048 73/865.9 |
| 5,305,428 A * | 4/1994 | Osawa | ................... | G06K 15/02 358/1.11 |
| 5,389,822 A * | 2/1995 | Hora | ................... | B60R 21/0132 701/45 |
| 5,955,961 A * | 9/1999 | Wallerstein | ........ | G06Q 20/3415 340/5.4 |
| 6,360,954 B1 * | 3/2002 | Barnardo | ......... | G06K 19/07703 235/487 |
| 6,607,136 B1 * | 8/2003 | Atsmon | ................. | G06Q 20/40 235/487 |
| 8,104,679 B2 * | 1/2012 | Brown | ................... | G06K 19/12 235/375 |
| 8,590,796 B1 * | 11/2013 | Cloutier | ........... | G06K 19/07745 235/493 |
| 11,321,677 B1 * | 5/2022 | Newman | ................. | G08B 21/24 |
| 2002/0120583 A1 * | 8/2002 | Keresman, III | ...... | C07D 209/88 705/65 |
| 2004/0177045 A1 * | 9/2004 | Brown | ............. | G06K 19/07354 705/65 |
| 2007/0034700 A1 * | 2/2007 | Poidomani | ....... | G06K 19/07722 235/492 |
| 2007/0080931 A1 * | 4/2007 | Chen | ..................... | G06F 3/0219 345/156 |
| 2008/0067247 A1 * | 3/2008 | McGregor | ......... | G06K 19/0704 235/380 |
| 2008/0156885 A1 * | 7/2008 | Landau | ............. | G06K 19/0702 235/492 |
| 2009/0048971 A1 * | 2/2009 | Hathaway | ............ | G06Q 20/346 705/41 |

(Continued)

*Primary Examiner* — Daniel I Walsh
(74) *Attorney, Agent, or Firm* — KDW Firm PLLC

(57) ABSTRACT

Embodiments are directed to methods and techniques for providing power via piezoelectric components on contactless cards.

18 Claims, 7 Drawing Sheets

(56) References Cited

U.S. PATENT DOCUMENTS

| | | | |
|---|---|---|---|
| 2009/0164381 A1* | 6/2009 | Brown | G06Q 20/3672 705/65 |
| 2009/0255996 A1* | 10/2009 | Brown | G07F 7/1008 235/493 |
| 2010/0052912 A1* | 3/2010 | Arneson | G06K 19/07345 340/572.7 |
| 2010/0141417 A1* | 6/2010 | Boes | B60C 23/0408 73/146 |
| 2011/0140841 A1* | 6/2011 | Bona | G06K 19/06196 340/5.83 |
| 2011/0166824 A1* | 7/2011 | Haisty | G01B 5/18 702/170 |
| 2011/0257928 A1* | 10/2011 | Cunningham | G01L 25/006 324/109 |
| 2012/0085826 A1* | 4/2012 | Talker | G06K 19/08 235/494 |
| 2012/0295662 A1* | 11/2012 | Haubrich | G08C 23/04 455/556.1 |
| 2012/0305654 A1* | 12/2012 | Wang | G06K 19/07707 235/492 |
| 2013/0076206 A1* | 3/2013 | Rosenberg | H03K 17/964 310/319 |
| 2013/0141399 A1* | 6/2013 | Cho | G06F 3/03545 345/179 |
| 2013/0299592 A1* | 11/2013 | Chiang | G06K 19/07309 235/492 |
| 2014/0084059 A1* | 3/2014 | Sierchio | G06K 19/0719 235/492 |
| 2016/0019449 A1* | 1/2016 | Auten | G06K 19/06206 235/492 |
| 2017/0110007 A1* | 4/2017 | Nahum | G01B 3/205 |
| 2017/0119119 A1* | 5/2017 | Borosevich | A45C 13/04 |
| 2019/0183703 A1* | 6/2019 | Paul | A61G 7/012 |
| 2019/0318311 A1* | 10/2019 | Chen | G06Q 10/0838 |
| 2021/0142140 A1* | 5/2021 | Lane | G06F 21/32 |
| 2021/0216842 A1* | 7/2021 | Mullen | G06Q 20/3552 |
| 2022/0046228 A1* | 2/2022 | Haskin | H04N 17/002 |
| 2022/0055223 A1* | 2/2022 | Cheon | B25J 11/0005 |
| 2022/0149802 A1* | 5/2022 | An | C23C 16/303 |
| 2022/0289588 A1* | 9/2022 | Reid | H10N 60/855 |
| 2023/0180730 A1* | 6/2023 | Haensgen | G01D 5/16 43/17 |
| 2023/0213786 A1* | 7/2023 | Chene | G02C 7/085 359/666 |
| 2024/0102871 A1* | 3/2024 | Tsangarides | G01L 1/16 |

* cited by examiner

SYSTEMS AND METHODS TO GENERATE POWER FOR A CONTACTLESS CARD VIA A PIEZOELECTRIC COMPONENT

BACKGROUND

Increasingly, consumers have come to rely on debit, credit, and stored value cards as a preferred vehicle to provide payment for transactions. These cards provide ready access to funds, offer financial protection superior to cash or checks, support loyalty programs, and allow consumers to take advantage of purchasing opportunities when funds may not be otherwise available. As these cards have become increasingly popular, the need for consumers to carry cash or checkbooks is still further reduced.

Within the past few years, card associations and issuers have been providing transaction cards that are enhanced with features beyond the typical embossed account number, expiration date, cardholder name, signature area, and magnetic stripe. "Smart cards," for example, have now come into popular use and allow for enhanced security of both debit and credit cards by use of onboard integrated circuits to provide memory and microprocessor functionality.

Even though smart cards and electronics-enhanced cards have improved over traditional credit cards, they suffer from many deficiencies. For example, the electronic circuitry on enhanced financial transaction cards must receive externally-provided power to operate. Typically, they obtain power from a merchant's financial or Point-Of-Service (POS) terminal. In one example, the cards utilize a contact-type interface having physical connectors to interface with a terminal. In another example, the cards are powered by a terminal-generated radio frequency (RF) electromagnetic field using an inductor part of the card's circuitry. In both examples, the cards rely on an external source for power, which may not always be functioning properly. Additionally, as the cards become more complex, an outside source may not provide adequate power for the cards to perform all of their complex operations, e.g, perform complex calculations and provide power to other components such as memory and displays. Embodiments discussed herein are directed to solving these problems.

BRIEF SUMMARY

Embodiments may be generally directed to technical and devices to perform operations on a contactless card. One example, includes a contactless card, includes one or more interfaces comprising contact pads and a chip, a magnetic stripe, a near-field communication (NFC) interface and antenna, or a combination thereof, the one or more interfaces configured to enable performance of transactions. The contactless card further includes a button configured to receive physical stress or force, a piezoelectric component coupled with the button, the piezoelectric component configured to detect the physical stress or force applied to the button, and in response to the physical stress or force generate power, and a display device coupled with the piezoelectric component via a transmission line, the display device configured to receive the power from the piezoelectric component via the transmission line and to display information in response to receiving the power.

Embodiments may also include technics and methods to perform via a contactless card. In one example, a method to power a contactless card including a display device with a piezoelectric component, may include receiving a physical stress or force by a button implemented on the contactless card, the button to physically engaging the piezoelectric component, generating, by the piezoelectric component, power in response to the physical stress or force, providing, by the piezoelectric component, the power to the display device, wherein the piezoelectric component and the display device are coupled via an interconnect embedded in the contactless card, and displaying, by the display device, information in response to receiving power from the piezoelectric component.

In another example, a method to power other components of the contactless card includes receiving a physical stress or force by a button implemented on the contactless card, the button to physically engaging the piezoelectric component, generating, by the piezoelectric component, power in response to the physical stress or force, providing, by the piezoelectric component, the power to the one or other components, wherein the piezoelectric component and the one or more other components are coupled via an interconnect embedded in the contactless card, and causing one or more operations to be performed based on the power received from the piezoelectric component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

Figure 1:
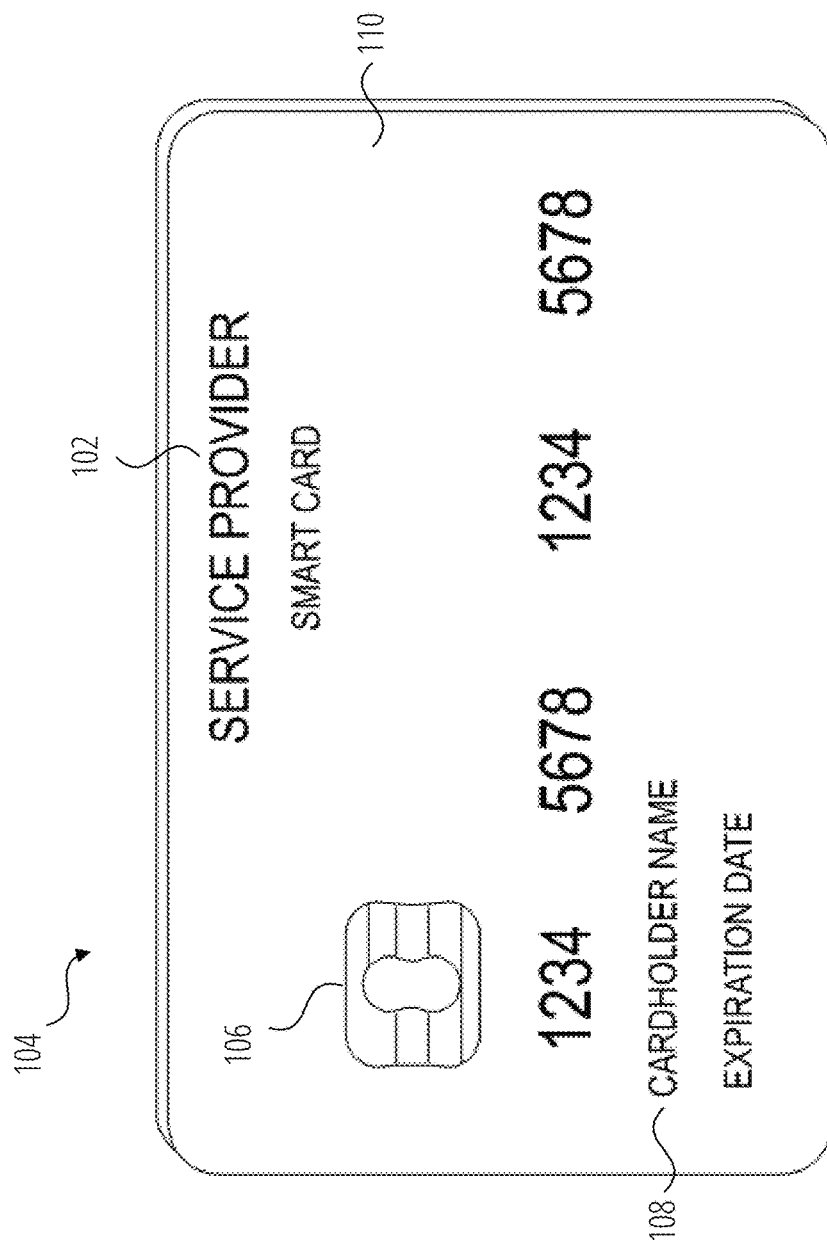

FIG. 1 illustrates a contactless card 104 in accordance with embodiments.

Figure 2:
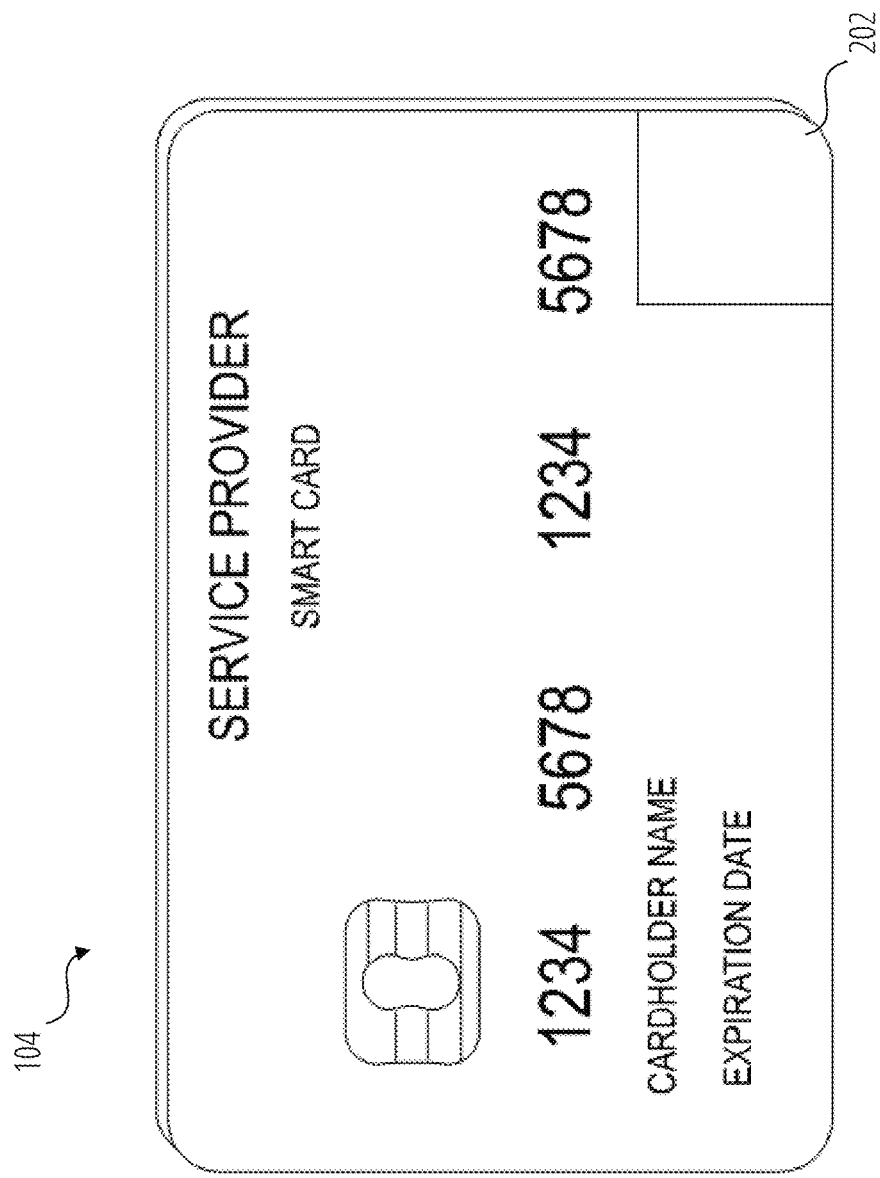

FIG. 2 illustrates an aspect of the contactless card 104 in accordance with embodiments.

Figure 3A:
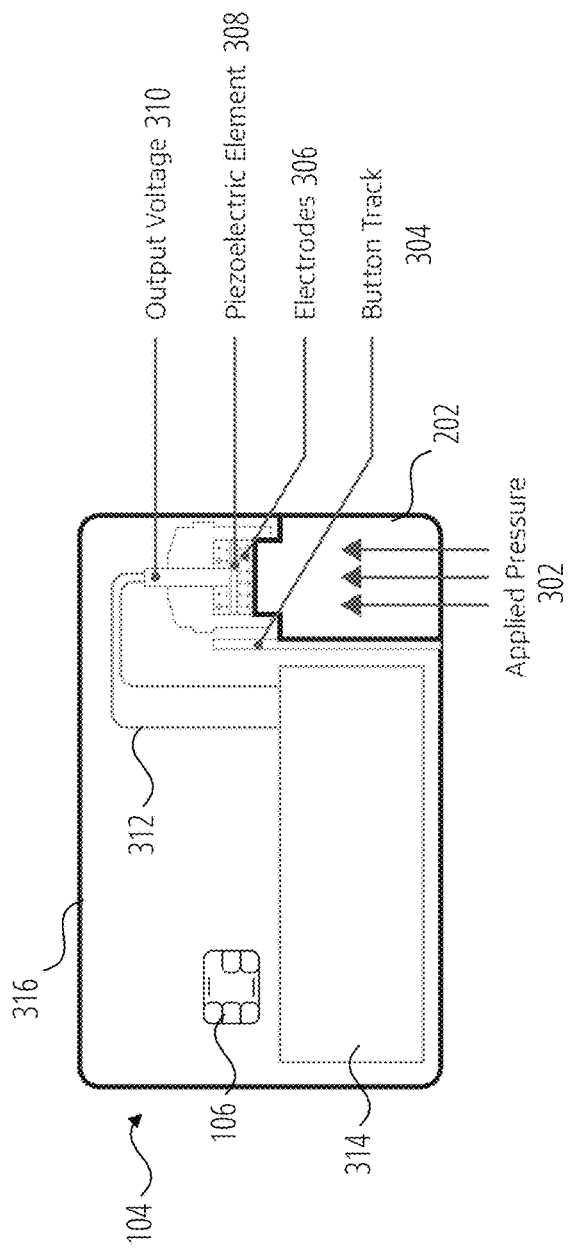

FIG. 3A illustrates an aspect of the contactless card 104 in accordance with embodiments.

Figure 3B:
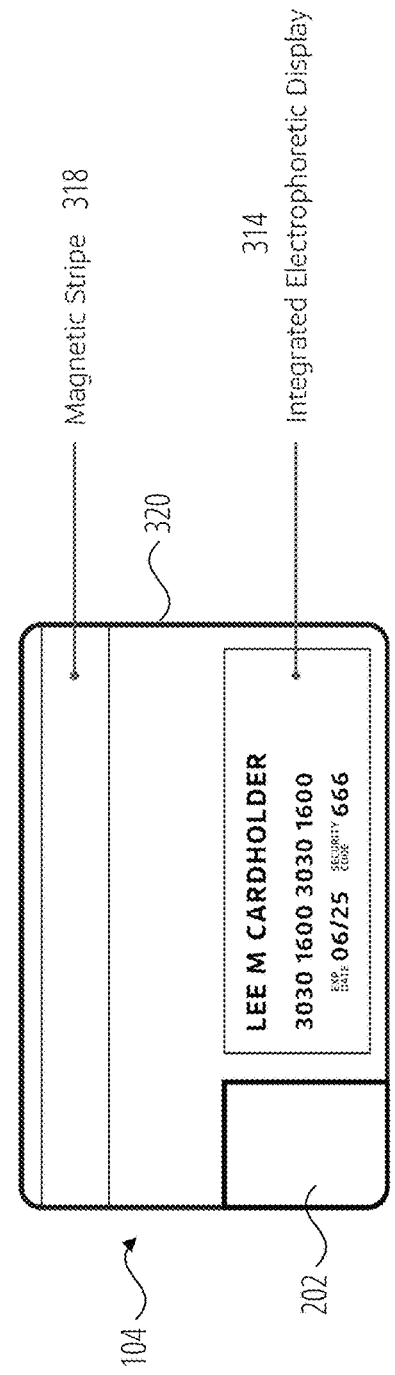

FIG. 3B illustrates an aspect of the contactless card 104 in accordance with embodiments.

Figure 4:
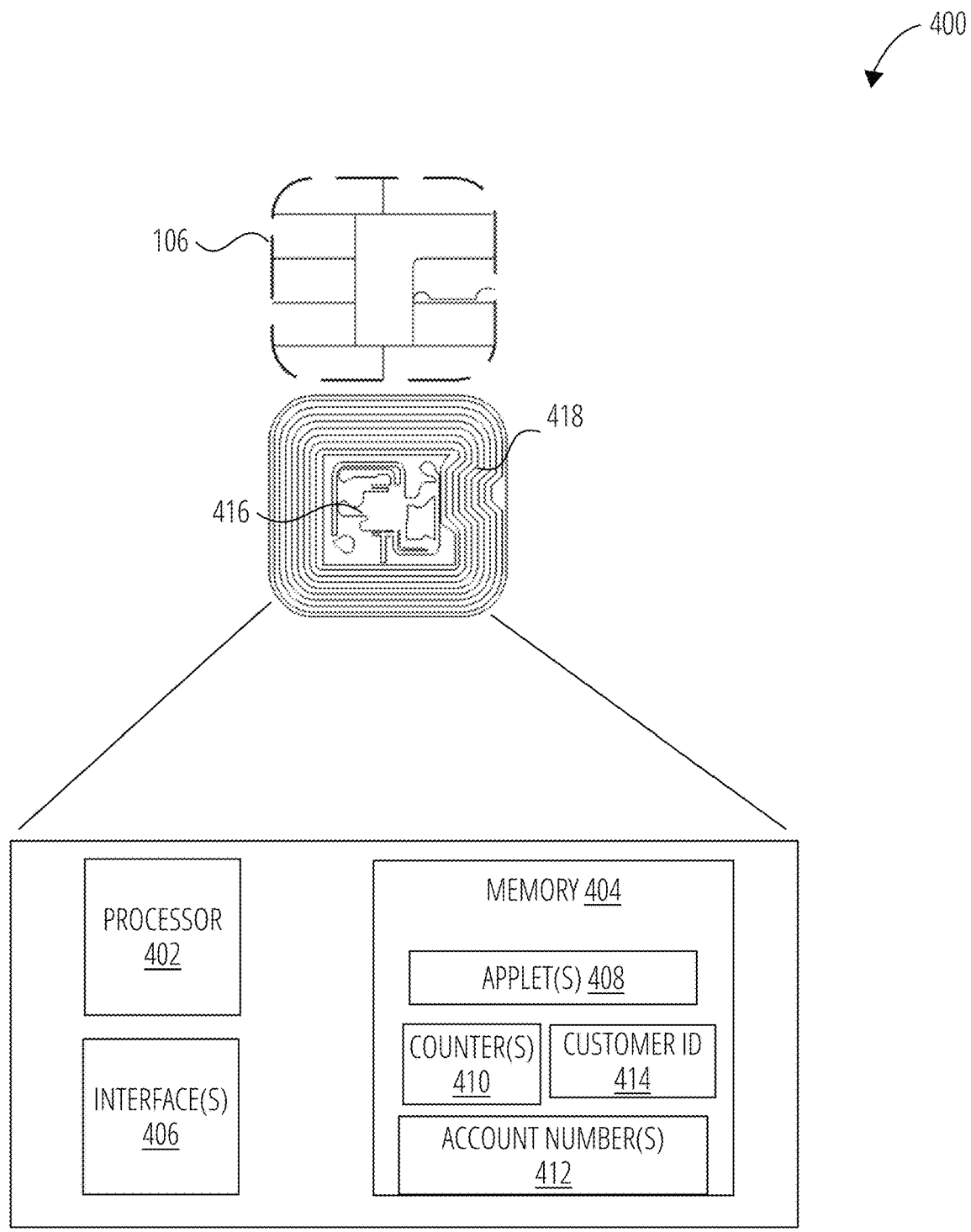

FIG. 4 illustrates a transaction card component 400 in accordance with one embodiment.

Figure 5:
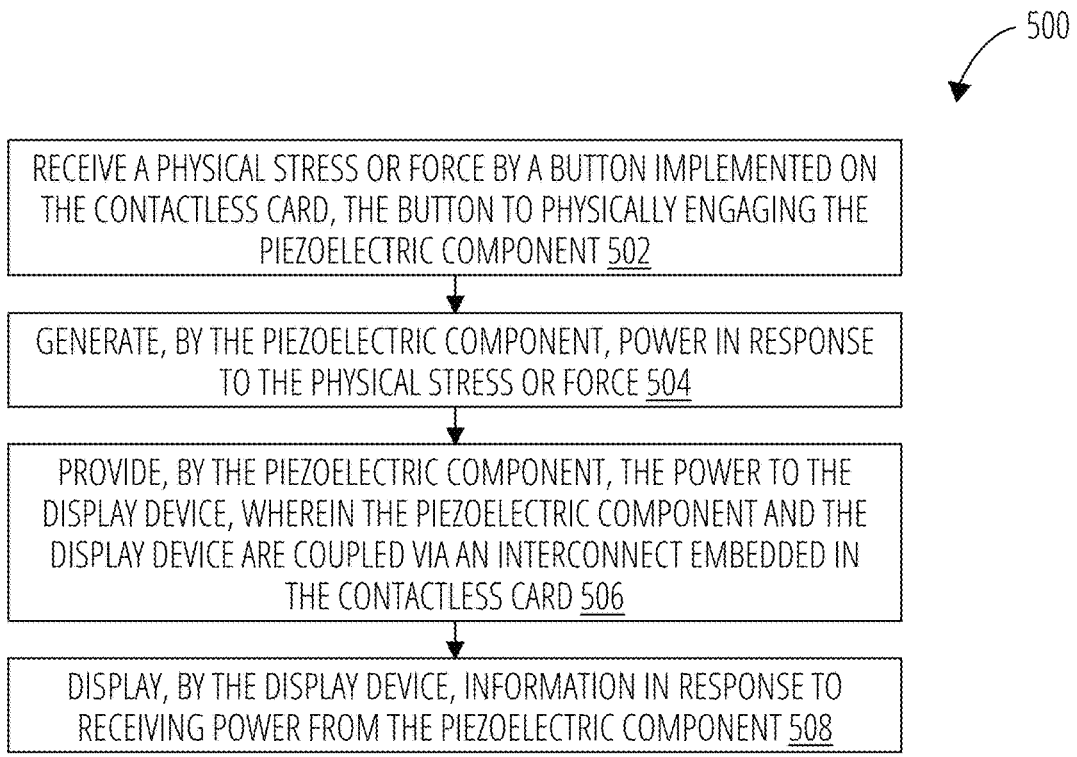

FIG. 5 illustrates a routine 500 in accordance with embodiments.

Figure 6:
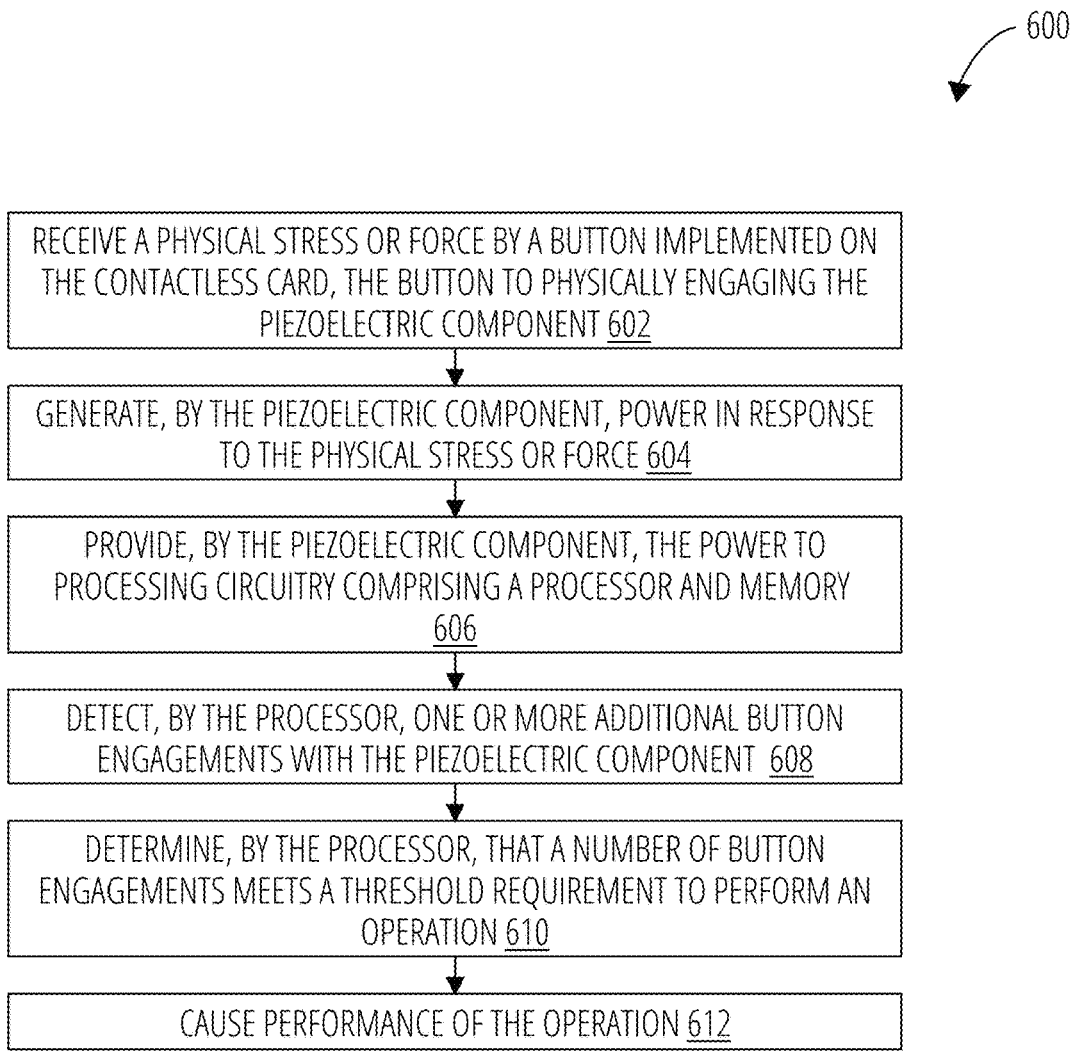

FIG. 6 illustrates a routine 600 in accordance with embodiments.

Figure 7:
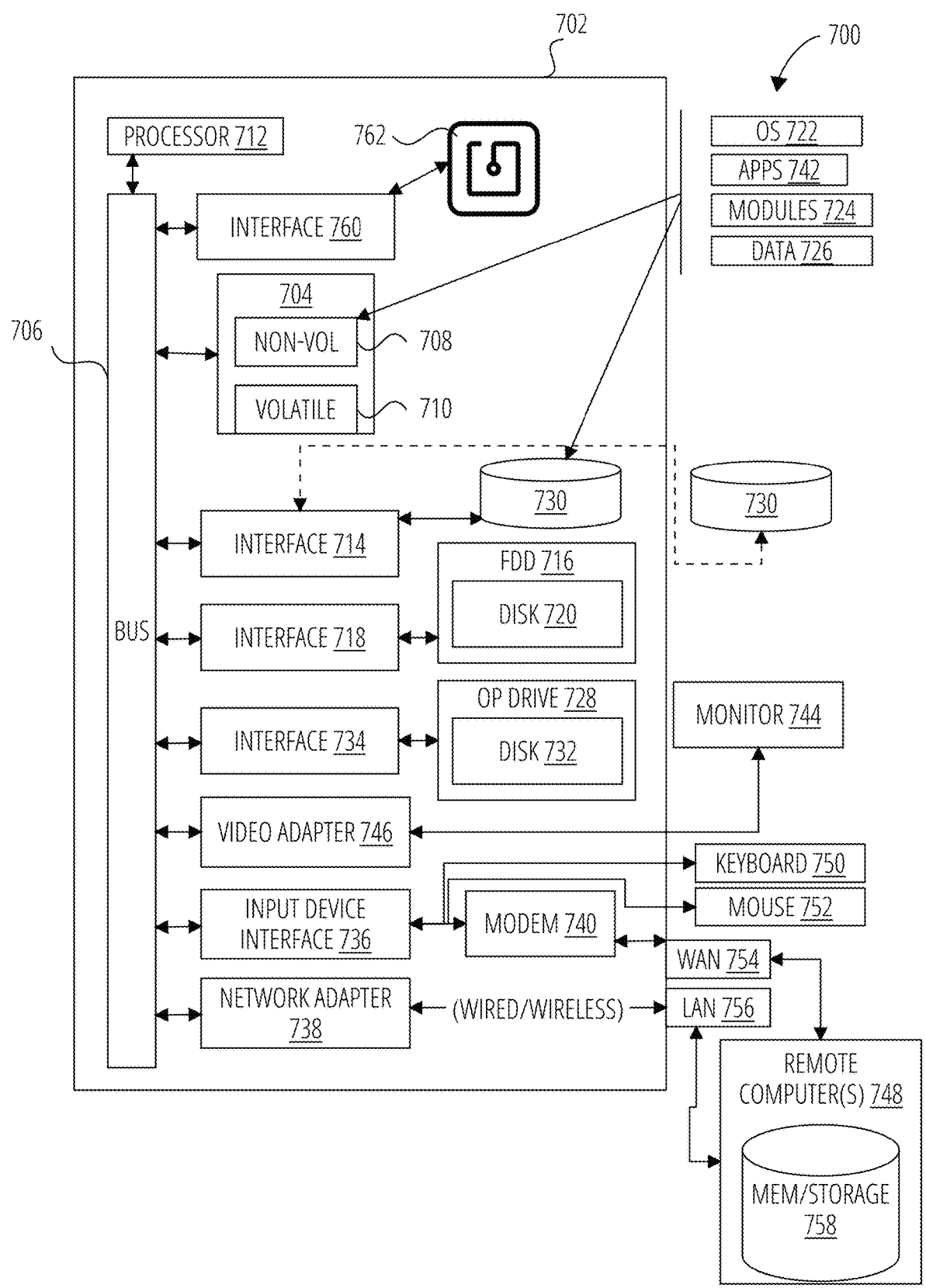

FIG. 7 illustrates a computer architecture 700 in accordance with one embodiment.

DETAILED DESCRIPTION

Embodiments are generally directed to systems and techniques to provide on card power for contactless card via a piezoelectric component. The contactless card includes a mechanical structure, such as a button, that a user may engage or use to contact or apply a force to the piezoelectric component. The piezoelectric component is configured to convert the mechanical force into electrical energy. In embodiments, the piezoelectric component is physically and electrically coupled with one or more other components of the contactless card to provide power. For example, the piezoelectric component may be coupled with a display device of the contactless card to provide power. The display device may be configured to display information upon receiving power from the piezoelectric component. In another example, the piezoelectric component may provide power to processing circuitry configured to perform complex operations.

In some embodiments, the mechanical structure with the piezoelectric component may be utilized by a user as input device to cause one or more operations to be performed by other components of the contactless card. For example, the display device may be configured to enable an backlight when a user presses the button a number of times greater than a configured value, e.g., three times. As will be discussed in more detail in the following discussion, the contactless card may be configured to perform more complex operations based on the number of inputs detected.

With general reference to notations and nomenclature used herein, one or more portions of the detailed description which follows may be presented in terms of program procedures executed on a system or contactless card. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital circuitry as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

FIG. 1 illustrates an example configuration of a contactless card 104, which may include a contactless card, a payment card, such as a credit card, debit card, or gift card, issued by a service provider as displayed as service provider indicia 102 on the front or back of the contactless card 104. In some examples, the contactless card 104 is not related to a payment card and may include, without limitation, an identification card. In some examples, the transaction card may include a dual interface contactless payment card, a rewards card, and so forth. In addition, the contactless card 104 may include a substrate 110, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104, according to the present disclosure, may have different characteristics, and the present disclosure does not require a transaction card to be implemented in a payment card.

The contactless card 104 may also include identification information 108 displayed on the card's front and/or back, and a contact pad 106. The contact pad 106 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna, and other components as will be further discussed in FIG. 4. These components may be located behind the contact pad 106 or elsewhere on the substrate 110, e.g., within a different layer of the substrate 110, and may be electrically and physically coupled with the contact pad 106. The contactless card 104 may also include a magnetic strip or tape, which may be located on the back of the card (not shown in FIG. 1). The contactless card 104 may also include a Near-Field Communication (NFC) device coupled with an antenna capable of communicating via the NFC protocol. Embodiments are not limited in this manner.

A contactless card may be powered passively, e.g., via energy generated by a magnetic field. A contactless card may include a battery or other power store in other examples. However, using either passive power or a battery is problematic. For example, the contactless card powered passively may not always have power when desired or insufficient power may be supplied to enable the contactless card 104 to perform all of its complex operations. A battery is an additional, expensive component added to the contactless card and requires recharging from time to time. Additionally, a battery is typically made of hazardous materials that are difficult to handle. Embodiments discussed herein provide advantages of these examples by providing a simple mechanical way to provide power at any time to the contactless card through the use of a piezoelectric component. In embodiments discussed herein, a physical force may be applied to the piezoelectric component to generate power for a contactless card to perform any number of functions, e.g., light up a display device, power circuitry, energize an antenna, etc.

FIG. 2 illustrates an example configuration of the contactless card 104 including a button 202 that may be utilized to generate physical force converted into power or energy by the piezoelectric component. In the illustrated example, contactless card 104 includes a button 202 on the bottom-right edge of the card. The button 202 may be made of the same material as the contactless card 104, e.g., metal, plastic, etc., and when not in use, may form a portion of the body of the contactless card 104 itself.

The button 202 may engage the contactless card 104 in a number of different ways. For example, the button 202 may slide within a slot or groove of the contactless card 104, as illustrated in FIGS. 3A and 3B. In this configuration, a user may apply force to the button 202, causing the button 202 to slide in a slot or groove of the contactless card 104. The button 202 may engage the piezoelectric component with force proportional to the amount of force applied by the user, and the piezoelectric component will generate energy for the card. However, embodiments are not limited in this manner.

In some instances, the button 202 may be physically attached to the contactless card 104 along one or more of the edges and configured to enable a user to put downward pressure on the button 202 and the piezoelectric component. The button 202 may be attached to the contactless card 104 via a hinge that enables the button to move up and down and allows the user to put downward pressure on the piezoelectric component. A spring or another mechanism may be used to put upward pressure on the button 202 to hold the button 202 in a starting position. Other examples may include the contactless card 104 having a raised bendable/flexible portion that may be compressed by a user to engage the piezoelectric component. Embodiments are not limited to these examples.

With reference now to FIGS. 3A/3B, FIG. 3A illustrates an example configuration of the contactless card 104 configured with the button 202. In the illustrated example, the button 202 is configured to slide in a track 304, such as a slot or a groove, in the contactless card 104. Specifically, the track 304 enables the button 202 to slide on the front side 316 of the contactless card 104 in a direction based on the applied pressure 302. As illustrated, the applied pressure 302 may be a pushing motion that pushes the button 202 in a direction from one edge (bottom) of the contactless card 104 to another edge (top) of the contactless card 104. The button 202 is configured to physically engage the piezoelectric component 308 with an amount of pressure, e.g., the applied pressure 302. The piezoelectric component 308 is configured to convert the physical stress or energy into electrical energy to power one or more components of the contactless card 104.

The piezoelectric component 308 may be any device that uses the piezoelectric effect to measure changes in pressure, acceleration, temperature, strain, or force by converting them to an electrical charge. The piezoelectric component 308 generally has a high direct current output impedance and can be utilized as a proportional voltage source and filter network. The voltage V at the source is directly proportional to the applied force, pressure, or strain. The output signal is then related to this mechanical force as if it had passed through an equivalent circuit.

In embodiments, the piezoelectric component 308 may be configured based on the effect being measured. For example, the piezoelectric component 308 may be configured to measure pressure and is configured with a thin membrane and a base to apply pressure, e.g., in the direction applied to the button 202. In another example, the piezoelectric component 308 may be configured to detect acceleration and includes a seismic mass attached to the crystal elements to detect the acceleration applied to the button 202. Embodiments are not limited to these examples.

In embodiments, the piezoelectric component 308 may be coupled with one or more electrodes 306 that are configured to provide an electrical output of the piezoelectric component 308 to the other components of the contactless card 104. Specifically, the electrodes 306 may be further coupled with one or more transmission lines 312 configured to carry a current to the other components such as the display device 314, the processing circuitry coupled with the contact pad 106, memory, and so forth.

In embodiments, at least a portion of one or more of the piezoelectric component 308, the electrodes 306, the transmission lines 312, and the components may be embedded in the contactless card. In one example, the contactless card 104 may include a front side 316 and a backside 320, which are configured as two separate layers. One or more of the piezoelectric component 308, electrodes 306, the transmission lines 312, and the components may be sandwiched between the front side 316 and the backside 320. In some instances, the piezoelectric component 308, the electrodes 306, the transmission lines 312, and the components may be embedded in a third layer of material between the front side 316 and the backside 320.

Additionally, one or more of the components may be configured to penetrate through one or more of the layers or sides. For example, the display device 314 may include at least a portion layered on and/or make up the backside 320 of the contactless card 104 while also having one or more connectors coupled with the transmission lines 312 in a middle layer. Similarly, at least a portion of the piezoelectric component 308 may be configured to engage the button 202 on the front side 316 of the contactless card 104 and be physically coupled with the electrodes 306 and the transmission lines 312 on the middle layer. Embodiments are not limited in this manner.

FIG. 3B illustrates the backside 320 of the contactless card 104. In the illustrated example, the button 202 is be configured as the corner of contactless card 104 as shown in FIG. 3B. The backside 320 may further include a magnetic stripe 318 and a display device 314. The magnetic stripe 318 may be configured to store data by modifying the magnetism of tiny iron-based magnetic particles on a band of magnetic material on the contactless card 104, and is read by swiping the magnetic stripe 318 past a magnetic reading head.

The display device 314 is configured to display information to a user in embodiments. For example, the display device 314 may display the accountholder's name, the account number, the expiration date, the security code (CVV), etc. In the illustrated example, the display device 314 is an integrated electrophoretic display; however, embodiments are not limited in this manner. For example, the display device 314 may be a reflective liquid crystal display (LCD), an electrochromic display, an organic light-emitting diode (OLED) display, and so forth.

In embodiments, the contactless card 104 includes additional components including a contact pad 106 coupled with processing circuitry 416. FIG. 4 illustrates a detail view of the processing circuitry 416 for storing, processing, and communicating information, including a processor 402, a memory 404, and one or more interface(s) 406. In embodiments, the processor 402, memory 404, and the interface(s) 406 may receive and function based on the power generated by the piezoelectric component and a user engaging the button. Moreover, it is understood that the processing circuitry 416 may contain additional components, including processors, memories, error and parity/CRC checkers, data encoders, anticollision algorithms, controllers, command decoders, security primitives, and tamper-proofing hardware, as necessary to perform the functions described herein.

The memory 404 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypted data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer. The customer identifier 414 may comprise a unique alphanumeric identifier assigned to a user of the contactless card 104, and the identifier may distinguish the user of the contactless card from other contactless card users. In some examples, the customer identifier 414 may identify both a customer and an account assigned to that customer and may further identify the contactless card 104 associated with the customer's account. As stated, the account number(s) 412 may include thousands of one-time use virtual account numbers associated with the contactless card 104. An applet(s) 408 of the contactless card 104 may be configured to manage the account number(s) 412 (e.g., to select an account number(s) 412, mark the selected account number(s) 412 as used, and transmit the account number(s) 412 to a mobile device for autofilling by an autofilling service.

The processor 402 and memory elements of the foregoing exemplary embodiments are described with reference to the contact pad 106, but the present disclosure is not limited thereto. It is understood that these elements may be implemented outside of the contact pad 106 or entirely separate from it, or as further elements in addition to processor 402 and memory 404 elements located within the contact pad 106.

In some examples, the contactless card 104 may comprise one or more antenna(s) 418. The one or more antenna(s) 418 may be placed within the contactless card 104 and around the processing circuitry 416 of the contact pad 106. For example, the one or more antenna(s) 418 may be integral with the processing circuitry 416, and the one or more antenna(s) 418 may be used with an external booster coil. As another example, one or more antenna(s) 418 may be external to the contact pad 106 and the processing circuitry 416.

In an embodiment, the coil of contactless card 104 may act as the secondary of an air-core transformer. The terminal may communicate with the contactless card 104 by cutting power or amplitude modulation. The contactless card 101 may infer the data transmitted from the terminal using the gaps in the contactless card's power connection, which may be functionally maintained through one or more capacitors.

The contactless card 104 may communicate back by switching a load on the contactless card's coil or load modulation. Load modulation may be detected in the terminal's coil through interference. More generally, using the antenna(s) 418, processor 402, and/or the memory 404, the contactless card 101 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter(s) 410 may be configured to increment. In some examples, each time data from the contactless card 104 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 101 is unable to determine the application transaction counter(s) 410 since there is no communication between applet(s) 408 on the contactless card 104.

In some examples, the counter(s) 410 may get out of sync. In some examples, to account for accidental reads that initiate transactions, such as reading at an angle, the counter(s) 410 may increment but the application does not process the counter(s) 410. In some examples, when the mobile device 10 is woken up, NFC may be enabled and the device 110 may be configured to read available tags, but no action is taken responsive to the reads.

To keep the counter(s) 410 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys that may be used in both encryption and data decryption. EMV may use triple DES (3DES) algorithm and it is implemented by hardware in the contactless card 104. Using the key diversification process, one or more keys may be derived from a master key based upon uniquely identifiable information for each entity requiring a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used to create the message authentication code (MAC) and perform the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique and assigned either by personalization or algorithmically assigned by some identifying information. For example, odd-numbered cards may increment by 2, and even-numbered cards may increment by 5. In some examples, the increment may also vary in sequential reads, such that one card may increment in sequence by 1, 3, 5, 2, 2, . . . repeating. The specific sequence or algorithmic sequence may be defined at personalization time or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

In some embodiments, processing circuitry 416 may be configured to perform one or more operations based on a button push and/or a number of button engagements. In one example, the instructions may include determining when a number of button presses meets and/or exceeds a threshold requirement to perform an operation. If the number of button meets or exceeds, the instructions are configured to cause an operation to be performed by the processing circuitry 416. The threshold requirement may be configurable at the time of manufacture or updated by a user through an interface, such as a mobile application.

In embodiments, an operation may include lighting a backlight of the display device. Another example may include displaying particular information based on a particular number of button pushes. If a user pushes the button three times, the instructions may cause the processing circuitry 416 to display the user's name but not the account number. However, if the user pushes button five, the display may display the account number. Embodiments are not limited in this manner, and instructions may be configurable to display particular information with a particular number of button pushes.

In another example, the operation may include changing account numbers for usage during transactions. Specifically, the operation may change an account number from a first number to a second number by writing/copying the new account number into a specific memory location. In embodiments, the contactless card 104 including the memory 404 may store a number of account numbers and the user may rotate through the account numbers. In some instances, the account numbers may be pre-loaded onto the contactless card 104 during the time of manufacture. The contactless card 104 may also be configured to receive new account numbers, e.g., via an interview with an ATM, POS terminal, a mobile device, etc. When an account number is changed by a user, the processing circuitry 416 may also be configured to present an indication on the display device, e.g., display the new account number. Embodiments are not limited to these examples.

FIG. 5 illustrates an example routine 500 in accordance with embodiments. As discussed herein, the routine 500 may be performed by a contactless card 104.

In block 502, routine 500 includes receiving physical stress or force by a button implemented on the contactless card. The button is configured to physically engage a piezoelectric component. For example, a button may be slid along a groove or slot formed in the body of the contactless card 104 in response to a user pushing the button, and the button may physically engage a piezoelectric component.

In block 504, the routine 500 includes generating power in response to physical stress or force by the piezoelectric component. As previously discussed, the piezoelectric component may be configured to generate power based on the pressure or acceleration applied by the user. The amount of power may be proportional to the amount of physical stress or force applied.

In block 506, the routine 500 includes providing the power to the display device by the piezoelectric component. The piezoelectric component may be coupled with the display device via one or more transmission lines or interconnects embedded in the contactless card. The transmission line(s) may be made of a conductive material, such as copper or gold, and may be connected to an output terminal of the piezoelectric component on one end and an input terminal of the display device on the other end. In some embodiments, the piezoelectric component may provide one or more different components of the contactless card. For example, power may be supplied to the processing circuitry including a processor and memory of the contactless card.

In block 508, the routine 500 includes displaying information in response to receiving power from the piezoelectric component by the display device. The information may be the cardholder's name, an account number, an expiration date, a security code, or a combination thereof. The display device may be configured to display other information in embodiments, such as an account balance, spending limits, etc.

FIG. 6 illustrates an example routine 600 that may be performed in accordance with embodiments discussed herein. Specifically, the operations of routine 600 may be performed by a contactless card 104 to perform an operation.

In block 602, the routine 600 includes receiving a physical stress or force by a button implemented on the contactless card. The button is configured to physically engage a piezoelectric component. Further and at block 604, the routine 600 includes generating power by the piezoelectric component in response to the physical stress or force. At block 606, the piezoelectric component provides the power to processing circuitry of the contactless card 104. As previously discussed, the processing circuitry may include a processor to process instructions and memory configured to store the instructions. The power provided may be sufficient enough for the processor to process the instructions. In some instances, a user may provide a number of button engagements to provide sufficient power and embodiments are not limited in this manner.

In block 608, the routine 600 includes detecting one or more additional button engagements with the piezoelectric component by the processor. For example, the processor may be configured to detect one or more power spikes or inputs on a power input line, and each power input corresponds with another button engagement made by the user. The processor may track or store a number of button engagements in memory.

In block 610, the routine 600 includes determining that a number of button engagements meets a threshold requirement to perform an operation by the processor. Further and at block 612, the routine 600 includes causing the performance of the operation. As previously discussed, the operation may include lighting a backlight of the display device, causing different information to be displayed on the display device, changing an account number to use for the transaction, and so forth. Embodiments are not limited to these examples.

FIG. 7 illustrates an embodiment of an exemplary computer architecture 700 suitable for implementing various embodiments as previously described. In one embodiment, the computer architecture 700 may include or be implemented as part of one or more systems or devices discussed herein. In one example, the computer architecture 700 may be implemented in a card reader configured to read and/or communicate with a contactless card 104, as discussed herein.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 7, the computing architecture 100 includes a processor 712, a system memory 704 and a system bus 706. The processor 712 can be any of various commercially available processors.

The system bus 706 provides an interface for system components including, but not limited to, the system memory 704 to the processor 712. The system bus 706 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The near-field communication circuitry 762 may be coupled to the processor 712 via an HDD interface 760 and be operable to receive and transmit payment information. For example, the near-field communication circuitry 762 may emit an electromagnetic field and/or be energized when in a electromagnetic field. In embodiments, the near-field communication circuitry 762 enables NFC communication via the NFC communication standard.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile 708 and/or volatile 710. A basic input/output system (BIOS) can be stored in the non-volatile 708.

The computer 702 may include various types of computer-readable storage media in the form of one or more lower speed memory units, including an internal (or external) hard disk drive 730, a magnetic disk drive 716 to read from or write to a removable magnetic disk 720, and an optical disk drive 728 to read from or write to a removable optical disk 732 (e.g., a CD-ROM or DVD). The hard disk drive 730, magnetic disk drive 716 and optical disk drive 728 can be connected to system bus 706 the by an HDD interface 714, and FDD interface 718 and an optical disk drive interface 734, respectively. The HDD interface 714 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 708, and volatile 710, including an operating system 722, one or more applications 742, other program modules 724, and program data 726. In one embodiment, the one or more applications 742, other program modules 724, and program data 726 can include, for example, the various applications and/or components of the systems discussed herein.

A user can enter commands and information into the computer 702 through one or more wire/wireless input devices, for example, a keyboard 750 and a pointing device, such as a mouse 752. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 712 through an input device interface 736 that is coupled to the system bus 706 but can be connected by other interfaces such as a parallel port, IEEE 1394 serial port, a game port, a USB port, an IR interface, and so forth.

A monitor 744 or other type of display device is also connected to the system bus 706 via an interface, such as a video adapter 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory and/or storage device 758 is illustrated. The logical connections depicted include wire/wireless connectivity to a local area network 756 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 756 networking environment, the computer 702 is connected to the local area network 756 through a wire and/or wireless communication network interface or network adapter 738. The network adapter 738 can facilitate wire and/or wireless communications to the local area network 756, which may also include a wireless access point disposed thereon for communicating with the wireless functionality of the network adapter 738.

When used in a wide area network 754 networking environment, the computer 702 can include a modem 740, or is connected to a communications server on the wide area network 754 or has other means for establishing communications over the wide area network 754, such as by way of the Internet. The modem 740, which can be internal or external and a wire and/or wireless device, connects to the system bus 706 via the input device interface 736. In a networked environment, program modules depicted relative to the computer 702, or portions thereof, can be stored in the remote memory and/or storage device 758. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A contactless card, comprising:
one or more interfaces comprising contact pads and a chip, a magnetic stripe, a near-field communication (NFC) interface and antenna, or a combination thereof, the one or more interfaces to enable performance of transactions;
a piezoelectric component configured to detect physical stress or force applied thereto, and in response to the physical stress or force, generate electrical power;
a button located on a first side of the contactless card, the button slidably engageable with a track to slide the button between a first position and a second position, wherein, in the first position, the button is disengaged with the piezoelectric component, and wherein a physical stress or force is applied to the button to cause the button to slide into the second position, and in the second position, the button is caused to physically engage the piezoelectric component to thereby generate the electrical power, wherein the piezoelectric component includes a seismic mass attached to crystal elements to detect an acceleration applied to the button, the electric power generated by piezoelectric component being further based on the detected acceleration; and
a display device coupled with the piezoelectric component via a transmission line, the display device to receive the electrical power from the piezoelectric component via the transmission line and to display information in response to receiving the electrical power.

2. The contactless card of claim 1, wherein the first side comprises at least one of the one or more interfaces; and the contactless card further comprises a second side comprising the display device.

3. The contactless card of claim 2, wherein the piezoelectric component and the transmission line are embedded between the first side and the second side.

4. The contactless card of claim 2, wherein the second side comprises the magnetic stripe.

5. The contactless card of claim 2, wherein the NFC interface and antenna are embedded between the first side and the second side.

6. The contactless card of claim 2, wherein the display device comprises an electrophoretic display and is at least partially embedded in the second side.

7. The contactless card of claim 1, wherein the information comprises a name, an account number, an expiration date, a security code, or a combination thereof.

8. The contactless card of claim 1, comprising:
a memory to store instructions; and
the chip having processing circuitry, wherein the memory and the chip at least partially receive electrical power from the piezoelectric component.

9. The contactless card of claim 8, wherein the processing circuitry to execute the instructions, that when executed, cause the processing circuitry to:
determine a number of button presses for the button and store the number of button presses in memory;
determine the number of button presses stored in memory meets a threshold requirement; and
in response to the number of button presses stored in memory meets the threshold requirement, cause an operation to occur on the contactless card.

10. The contactless card of claim 9, wherein the operation is to light a backlight of the display device.

11. The contactless card of claim 9, wherein the operation is to change usage of account number stored in the memory from a first account number to a second account number.

12. The contactless card of claim 9, wherein the operation is to cause the display device to display one or more of a name, an account number, an expiration date, a security code, or a combination thereof.

13. The contactless card of claim 1, wherein the contactless card comprises a substrate with one or more layers, wherein the button is integrated with the substrate as a portion of one or more layers of the substrate; or
wherein the contactless card comprises a body upon or within which the contact pads, chip, magnetic stripe, near-field communication (NFC) interface, antenna are arranged, wherein the button forms a portion of the body of the contactless card.

14. A method to power a contactless card, the contactless card including one or more interfaces comprising contact pads and a chip, a magnetic stripe, a near-field communication (NFC) interface and antenna, or a combination thereof, the one or more interfaces to enable performance of transactions, and a display device with a piezoelectric component, the method comprising:
receiving a physical stress or force by a button implemented on the contactless card, thereby causing the button to slide along a track from a first position, wherein the button is disengaged with the piezoelectric component, to a second position, whereby the button is caused to physically engage the piezoelectric component;
generating, by the piezoelectric component, electrical power in response to the button physically engaging the piezoelectric component as a result of the physical stress or force, wherein the piezoelectric component generates the electric power by using a seismic mass attached to crystal elements to detect an acceleration applied to the button;

providing, by the piezoelectric component, the electrical power to the display device, wherein the piezoelectric component and the display device are coupled via an interconnect embedded in the contactless card; and displaying, by the display device, information in response to receiving electrical power from the piezoelectric component.

15. The method of claim 14, comprising:

determining, by processing circuitry of the contactless card, a number of button engagements within a period of time;

determining, by the processing circuitry, the number of button engagements meeting or exceeding a threshold requirement; and performing one or more operations on the contactless card in response to the number of button engagements meeting or exceeding the threshold requirements.

16. The method of claim 15, wherein the one or more operations include lighting a backlight of the display device.

17. The method of claim 15, wherein the one or more operations include changing from a first account number to a second account number to use in transactions.

18. The method of claim 15, wherein the one or more operations include causing the display device to display one or more of a name, an account number, an expiration date, a security code, or a combination thereof.

* * * * *